United States Patent
Percy

(10) Patent No.: US 9,919,709 B2
(45) Date of Patent: Mar. 20, 2018

(54) CONTROL SYSTEM AND METHOD

(71) Applicant: JAGUAR LAND ROVER LIMITED, Warwickshire (GB)

(72) Inventor: Craig Percy, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 328 days.

(21) Appl. No.: 14/760,348

(22) PCT Filed: Dec. 6, 2013

(86) PCT No.: PCT/EP2013/075819
§ 371 (c)(1),
(2) Date: Jul. 10, 2015

(87) PCT Pub. No.: WO2014/111201
PCT Pub. Date: Jul. 24, 2014

(65) Prior Publication Data
US 2015/0353098 A1 Dec. 10, 2015

(30) Foreign Application Priority Data
Jan. 17, 2013 (GB) .................................. 1300876.8

(51) Int. Cl.
*B60W 30/186* (2012.01)
*B60W 10/02* (2006.01)
(Continued)

(52) U.S. Cl.
CPC .......... *B60W 30/186* (2013.01); *B60W 10/02* (2013.01); *B60W 10/06* (2013.01);
(Continued)

(58) Field of Classification Search
None
See application file for complete search history.

(56) References Cited

U.S. PATENT DOCUMENTS 5,993,354 A   11/1999  Winks
6,101,439 A   8/2000   Cutting et al.
(Continued)

FOREIGN PATENT DOCUMENTS

DE   102007046735 A1   4/2009
GB   2327731 A         2/1999
(Continued)

OTHER PUBLICATIONS

Combined Search and Examination Report under Sections 17 and 18(3) for Application No. GB1300876.8 dated Jun. 26, 2013.
(Continued)

*Primary Examiner* — Jacob S. Scott
(74) *Attorney, Agent, or Firm* — Carlson, Gaskey & Olds

(57) ABSTRACT

The present invention relates to a control system for a vehicle powertrain (3). The vehicle powertrain (3) includes a transmission (27), a launch control clutch (31), and a transfer case (39) selectively operable in a high range and a low range. The control system includes a monitor (53, 55) for monitoring one or more operating parameters of the launch control clutch (31) and/or the transmission (27). The control system comprises a controller (49) configured, in dependence on said monitoring means determining that said one or more operating parameters are above a predefined operating threshold or outside a predefined operating range, to output a notification to the user to select said low range; and/or to output a transfer case control signal to the transfer case (39) automatically to select said low range.

20 Claims, 3 Drawing Sheets

(51) Int. Cl.
*B60W 10/10* (2012.01)
*B60W 50/14* (2012.01)
*B60W 50/16* (2012.01)
*B60W 10/119* (2012.01)
*B60W 10/184* (2012.01)
*B60W 10/06* (2006.01)
*B60W 30/18* (2012.01)
*B60W 30/184* (2012.01)
*B60K 6/48* (2007.10)
*B60K 17/346* (2006.01)
*B60K 23/08* (2006.01)
*F16H 59/72* (2006.01)
*F16H 63/42* (2006.01)

(52) U.S. Cl.
CPC .......... *B60W 10/10* (2013.01); *B60W 10/119* (2013.01); *B60W 30/18027* (2013.01); *B60W 30/1843* (2013.01); *B60W 50/14* (2013.01); *B60W 50/16* (2013.01); *B60K 6/48* (2013.01); *B60K 17/3467* (2013.01); *B60K 23/08* (2013.01); *B60K 2006/4825* (2013.01); *B60W 10/184* (2013.01); *B60W 2420/00* (2013.01); *B60W 2510/0291* (2013.01); *B60W 2510/107* (2013.01); *B60W 2710/0666* (2013.01); *B60W 2710/1005* (2013.01); *B60W 2710/182* (2013.01); *B60Y 2300/186* (2013.01); *B60Y 2300/18025* (2013.01); *F16H 59/72* (2013.01); *F16H 2059/725* (2013.01); *F16H 2063/426* (2013.01); *F16H 2300/18* (2013.01); *F16H 2312/02* (2013.01); *Y02T 10/6221* (2013.01); *Y02T 10/6252* (2013.01); *Y02T 10/6265* (2013.01)

(56) References Cited

U.S. PATENT DOCUMENTS

| | | | | |
|---|---|---|---|---|
| 7,974,760 | B2* | 7/2011 | Rowley | B60W 10/02 701/51 |
| 2003/0022759 | A1 | 1/2003 | Frotscher | |
| 2014/0330466 | A1* | 11/2014 | Bureau | B60K 6/48 701/22 |

FOREIGN PATENT DOCUMENTS

| | | |
|---|---|---|
| JP | S6136544 A | 2/1986 |
| JP | S6154328 A | 3/1986 |
| JP | 2004340082 A | 12/2004 |
| JP | 2009214640 A | 9/2009 |
| JP | 2012031916 A | 2/2012 |
| JP | 2012149750 A | 8/2012 |
| JP | 2012153154 A | 8/2012 |
| JP | 2012177398 A | 9/2012 |
| WO | 2007130446 A2 | 11/2007 |
| WO | 2009066143 A2 | 5/2009 |

OTHER PUBLICATIONS

International Search Report for PCT International application No. PCT/EP2013/075819 dated Jun. 16, 2014.

* cited by examiner

CONTROL SYSTEM AND METHOD

TECHNICAL FIELD

The present invention relates to a control system and method and particularly, but not exclusively, to a control system and method for a vehicle powertrain. Aspects of the invention relate to a system, to a method and to a vehicle.

BACKGROUND OF THE INVENTION

It is known to provide a launch control clutch for selectively coupling an output shaft of an internal combustion engine to an input shaft of a vehicle transmission. The clutch comprises friction plates which are brought into contact with each other when the clutch is engaged to drivingly couple the shafts. To accommodate the speed differential between the input and output shafts, the friction plates are allowed to slip in relation to each other, thereby allowing the speed of the shafts to be matched progressively. The relative movement of the friction plates generates considerable heat which can potentially damage the clutch and, in the case of wet clutches immersed in a lubricating fluid, may result in degradation of the lubricating fluid. The problem of heat generation is particularly significant at low vehicle speed (for example <15 kph) when high torque is required. This combination is often encountered by four-wheel drive vehicles, for example during a hill start on a steep incline or towing a heavy load up an incline. These vehicles may have a transfer case to enable operation in high and low ranges; and a central differential to control the delivery of torque to the front and rear driven wheels.

A known approach for managing heat generated within the transmission is to control the output torque from the internal combustion engine. Alternative approaches include controlling the transmission, for example to disable double-gear changes; to slow gear changes; and to inhibit gear changes. These techniques rely on inhibiting functionality and this may be undesirable in certain driving scenarios, for example when towing heavy loads.

It is against this backdrop that the present invention has been conceived. At least in certain embodiments, the present invention sets out to overcome or ameliorate at least some of the shortcomings associated with prior art systems.

SUMMARY OF THE INVENTION

Aspects of the present invention relate to a control system for a vehicle powertrain; a vehicle; and a method of operating a vehicle powertrain as claimed in the appended claims.

According to a further aspect of the present invention there is provided a control system for a vehicle powertrain including a transmission, a launch control clutch, and a transfer case selectively operable in a high range and a low range; the control system comprising:
  means for monitoring one or more operating parameters of the launch control clutch and/or the transmission; and
  a controller configured, in dependence on said monitoring means determining that said one or more operating parameters are above a predefined operating threshold or outside a predefined operating range, to output: (a) a notification to the user to select said low range; and/or (b) a transfer case control signal to the transfer case automatically to select said low range. By monitoring said one or more operating parameters, the control system can operate the transfer case automatically to select said low range. Alternatively, the control system can output a notification to the user to indicate that the low range of the transfer case should be selected. At least in certain embodiments, the control system can operate to prevent or reduce damage to the powertrain. In particular, the control system can operate to protect the launch control clutch and/or the transmission lubricating fluid from heat damage.

The vehicle powertrain can also include a machine for delivering torque to the transmission. The machine can comprise one or more of the following: an internal combustion engine, an electric machine, a turbine, a liquefied petroleum gas (LPG) motor, etc.

The monitoring means can be suitable for monitoring an operating temperature of the launch control clutch and/or the transmission. The monitoring means can be configured to determine when said operating temperature exceeds at least a first temperature threshold. The at least one first temperature threshold can represent one or more temperatures above which the launch control clutch may incur heat-related damage; and/or the transmission lubricating fluid will begin to degrade. The at least one first temperature threshold can comprise a maximum temperature threshold. The monitoring means can comprise different temperature thresholds for the launch control clutch and the transmission. Alternatively, or in addition, the monitoring means can be configured to determine when said operating temperature exceeds at least a second temperature threshold over a defined time period. The defined time period can be implemented in the event that damage may occur only if exposure to the elevated temperature occurs over an extended time period. The first temperature threshold is typically higher than the second temperature threshold. The monitoring means can be configured to output a different notification in respect of each of said first and/or second temperature thresholds.

The monitoring means can comprise a first sensor for measuring the temperature of the launch control clutch; and/or a second sensor for measuring the temperature of the transmission lubricating fluid. The temperature of the transmission lubricating fluid is particularly relevant if the launch control clutch is integrated into the transmission. It will, however, be understood that the present invention is not limited to arrangements incorporating an integrated launch control clutch.

Alternatively, or in addition, the monitoring means can be configured to model the temperature of the launch control clutch and/or the transmission lubricating fluid. The temperature could, for example, be modelled based on the input and output speeds of the launch control clutch and/or the transmitted torque. To model the temperature, the monitoring means may also use one or more of the following: incline angle, vehicle load, vehicle speed, selected gear, transfer case operating range, vehicle response mode (for example based on current terrain settings), and trailer attached. The monitoring means can also monitor temperature based on fault status, for example faults detected in the Powertrain Control Module (PCM), Transmission Control Module (TCM), Anti-Lock Brake System (ABS), brakes, etc.

The control system can be configured to control the transmission automatically to select neutral. The control system can operate the transmission to select neutral before the transfer case selects said low range. The control module can be configured to partially or completely disengage the transmission from the machine for delivering torque. For example, the control system can be configured to operate the launch control clutch and/or an engagement clutch to disengage the transmission from an input torque.

The controller can be configured to output a torque control signal to reduce or inhibit a torque delivered to the transmission. The engine control unit can be configured to reduce the torque delivered to the transmission to a predefined torque threshold. For example, the torque threshold can be defined as approximately 300 Nm as this is considered sufficient to hold the vehicle stationary on most gradients. The torque control signal can, for example, control the machine for outputting torque to the transmission to reduce the delivered torque.

The controller can be configured to output a brake control signal to actuate a vehicle brake system to hold the vehicle stationary during selection of said low range. The controller could, for example, operate in conjunction with a vehicle hill hold function. Alternatively, or in addition, the controller can be configured to output a notification signal to the vehicle brake system to cause intermittent operation of the vehicle brake system. The notification signal could induce a 'shudder' effect in the vehicle to provide a driver notification of a particular event. This use of the brake system to provide driver notification is believed to be independently patentable. The notification to the driver could be in the form of haptic feedback via the steering wheel, for example utilising an Electric Power Assist Steering (ePAS) system.

The vehicle powertrain can comprise an electric machine and an internal combustion engine. The vehicle powertrain can comprise an integrated electric machine, for example disposed inside a transmission housing (for example inside the transmission bell-housing). The electric machine can be integrated into the transmission, for example in place of a torque converter. The launch control clutch can be disposed between the (integrated) electric machine and the internal combustion engine; or between the (integrated) electric machine and the transmission. In the arrangement in which the launch control clutch is disposed between the (integrated) electric machine and the internal combustion engine, the launch control clutch can selectively engage/disengage the internal combustion engine. In the arrangement in which the launch control clutch is disposed between the (integrated) electric machine and the transmission, the launch control clutch can selectively engage/disengage the electric machine.

The controller can be configured to inhibit the output of said notification and/or the automatic selection of said low range if the transfer case is already operating in said low range.

The controller can be configured to output one or more of the following notifications to the user: a message to slow the vehicle; a message to bring the vehicle to rest; and a message to reduce the requested torque. The controller can be configured to output the notification when the monitoring means determines that said one or more operating parameters are above the predefined operating threshold or outside the predefined operating range.

The controller can be configured to control operation of a second clutch for dissipating heat. The second clutch can be arranged to handle higher torques than the launch control clutch. The controller can be configured to operate the second clutch when the monitoring means determines that said one or more operating parameters are above the predefined operating threshold or outside the predefined operating range. A dual clutch arrangement could be provided, for example incorporating a first clutch pack within a second clutch pack. In use, the controller could switch from the first clutch pack to the second clutch pack (or vice versa) in order to allow heat to dissipate. The first clutch pack could be smaller than the second clutch pack.

A coolant system can be provided for dissipating heat from the launch control clutch. The coolant system can be integrated into the transmission. Alternatively, or in addition, an external fan and/or a coolant pump can be provided for dissipating heat from the launch control clutch. The controller can be configured to control operation of the coolant system, the external fan and/or the coolant pump in dependence on said monitoring means determining that said one or more operating parameters are above the predefined operating threshold or outside the predefined operating range.

According to a further aspect of the present invention there is provided a vehicle comprising the control system as described herein.

According to a still further aspect of the present invention there is provided a method of operating a vehicle powertrain including a transmission, a launch control clutch, and a transfer case operable in a high range and a low range; the method comprising:

monitoring one or more operating parameters of the launch control clutch and/or the transmission; and when said one or more operating parameters are above a predefined threshold or outside a predefined operating range, automatically selecting said low range and/or outputting a notification to the user to select said low range.

The user notification can comprise one or more of the following: application of a variable braking force; application of a torque pulse controlled by the engine management system; application of a torque pulse generated by an electric motor; a pulse applied through a steering wheel (for example employing Electronic Power Assisted Steering); a haptic pulse applied through a driver seat; a sonic pulse through on-board speakers; and a message output over the on-board speakers.

The method can comprise monitoring an operating temperature of the launch control clutch and/or the transmission. The method can include determining when the operating temperature exceeds a first temperature threshold and/or a second temperature threshold over a defined time period.

The method can comprise operating the transmission automatically to select neutral. The method can comprise placing the transmission in neutral and then placing the transfer case in said low range. Alternatively, or in addition, the torque delivered to the transmission (for example from an internal combustion engine and/or an electric machine) can be reduced; and the vehicle brake system can be operated to hold the vehicle stationary. For example, the method could comprise automatic engagement of an electronic park brake; engaging low range in the transfer case when the electronic park brake is engaged; and then releasing the electronic park brake.

According to a still further aspect of the present invention there is provided a control system for a vehicle powertrain including a transmission and a launch control clutch; the control system comprising:

means for monitoring one or more operating parameters of the launch control clutch and/or the transmission; and a controller configured, in dependence on said monitoring means determining that said one or more operating parameters are above a predefined operating threshold or outside a predefined operating range, to output: (a) a notification to the user to operate the transmission to select a lower gear; and/or (b) a transmission control signal to the transmission automatically to select a lower gear. The vehicle powertrain can also comprise a transfer case selectively operable in a high range and a low range. The control system can be implemented for a hybrid vehicle, for example comprising an internal combustion engine and an electric machine.

According to a yet further aspect, there is provided a method of operating a vehicle powertrain including a transmission and a launch control clutch; the method comprising:
monitoring one or more operating parameters of the launch control clutch and/or the transmission; and
when said one or more operating parameters are above a predefined threshold or outside a predefined operating range, automatically selecting a lower gear in said transmission and/or outputting a notification to the user to select a lower gear in said transmission.

According to a yet further aspect of the present invention there is provided a control system for a vehicle powertrain, the control system being configured to output a variable brake control signal for providing haptic feedback. The variable brake control signal can induce a perceptible vehicle movement, for example a vibration (or 'shudder') which is transmitted into the vehicle cabin to provide the driver with haptic feedback. The variable brake control signal could induce a perceptible fluctuation in the vehicle speed or acceleration. The variable brake control signal could, for example, be supplied to an anti-lock brake system (ABS) modulator to cause a light intermittent application of the brakes. The control system can thereby operate the vehicle brake system to provide haptic feedback to the driver.

The variable brake control signal could comprise one or more pulses (for example having a square, saw-tooth or sinusoidal form) for varying the applied braking force. The frequency and/or magnitude of the pulses could be uniform or non-uniform.

The variable brake control signal can provide feedback to notify the driver of a predefined vehicle operating condition. The control system could, for example, be configured to output said variable brake control signal to indicate an event, such as elevated transmission or clutch temperature. The mean vehicle speed could remain substantially constant or decrease during application of said variable brake control signal.

According to a still further aspect of the present invention there is provided a method of operating a vehicle powertrain to provide a driver alert, the method comprising automatically generating a variable brake control signal to induce a perceptible vehicle movement. The perceptible vehicle movement can, for example, be a vibration (or 'shudder') transmitted through the vehicle. The perceptible vehicle movement could comprise a fluctuation in the vehicle speed.

According to a yet further aspect of the present invention there is provided a control system for a vehicle powertrain, the control system being configured to generate a torque pulse for providing haptic feedback. The torque pulse can provide feedback to notify the driver of a predefined vehicle operating condition. The control system can output a torque request signal to a machine, such as an internal combustion engine and/or an electric traction motor, for outputting torque. The torque pulse could be output by the internal combustion engine whilst the electric traction motor operates as a generator to apply a regenerative braking force. The torque pulse could thereby be balanced by the electric motor. This operating mode would provide feedback to the driver (due to the increase in the engine speed/load) without affecting dynamic operating parameters of the vehicle. The vehicle system controller can switch between the internal combustion engine and the electric motor. Alternatively, the transmission could request this operating mode over a vehicle communication system (such as the CAN bus). The torque request signal could, for example, be output to an engine management system and/or an inverter for an electric traction machine. According to a yet further aspect of the present invention there is provided a method of operating a vehicle powertrain to provide a driver alert, the method comprising automatically generating a torque pulse to induce a perceptible vehicle movement. The torque pulse could comprise an increase or a decrease in the applied torque. The torque pulse can be generated by a machine for outputting torque. The machine can comprise one or more of the following: an internal combustion engine, an electric machine or a kinetic drive (such as a flywheel).

Within the scope of this application it is expressly intended that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

Embodiments of the present invention will now be described, by way of example only, with reference to the accompanying figures, in which.

DETAILED DESCRIPTION OF AN EMBODIMENT

Figure 1:
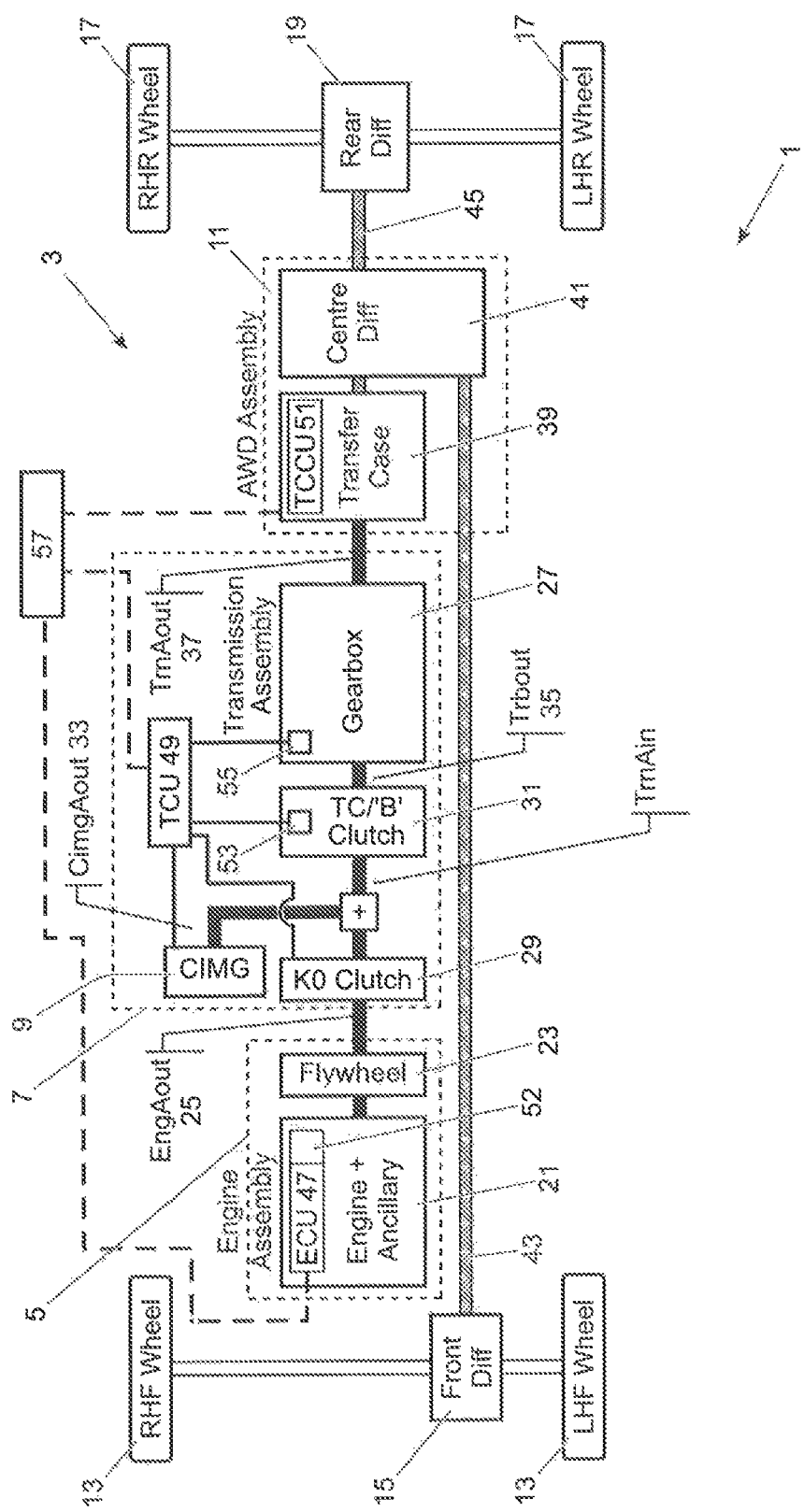
FIG. 1 shows a schematic representation of a vehicle powertrain incorporating a control module in accordance with an embodiment of the present invention.

A vehicle 1 comprising a powertrain 3 in accordance with an embodiment of the present invention will now be described with reference to FIG. 1. The vehicle 1 is a hybrid vehicle comprising an internal combustion engine assembly 5; a transmission assembly 7 having an integrated electric traction motor 9; and an all-wheel drive (AWD) assembly 11. The vehicle 1 is four-wheel drive, the front wheels 13 are driven via a front differential 15 and the rear wheels 17 are driven via a rear differential 19.

The internal combustion engine assembly 5 comprises an internal combustion engine 21 having a flywheel 23 mounted to an engine output shaft 25. The transmission assembly 7 comprises an automatic transmission 27 coupled to the engine output shaft 25 by a first (K0) clutch 29 and a second ('B') clutch 31, both of which are 'wet' clutches (i.e. the friction plates are immersed in a lubricating fluid, such as oil). The integrated electric traction motor 9 is disposed inside a transmission bell-housing (not shown) and an electric motor output shaft 33 is coupled to the powertrain between the first and second clutches 29, 31. The first clutch 29 is operable selectively to engage/disengage the engine output shaft 25. The second clutch 31 is a launch control clutch permitting slip to occur to enable the vehicle 1 to pull away. A transmission input shaft 35 couples the second clutch 31 to the automatic transmission 27. A transmission output shaft 37 couples the automatic transmission 27 to the AWD assembly 11. The transmission assembly 7 does not include a torque converter in the present embodiment and the integrated electric traction motor 9 is disposed inside the transmission bell-housing in place of the torque converter. A suitable integrated transmission is the 8-speed automatic transmission supplied by ZF Friedrichshafen, PO Box 650464, 66143 Saarbrücken, Germany. (The launch control clutch 31 is referred to as the Integrated Starting Element (IAE) in the transmission supplied by ZF Friedrichshafen.)

The all-wheel drive assembly 11 comprises a transfer case 39 and a centre differential 41. The transfer case 39 is coupled to the transmission output shaft 37 and is selectively operable in a high range and a low range. In the present embodiment, the transfer case 39 is manually operated to select said high and low ranges, but automatic selection could be implemented. The centre differential 41 is coupled to the front and rear differentials 15, 19 by respective front and rear drive shafts 43, 45.

The vehicle powertrain 3 comprises a series of control means for controlling operation of the respective assemblies 5, 7, 11. Specifically, the engine assembly 5 comprises an engine control unit (ECU) 47; the transmission assembly 7 comprises a transmission control unit (TCU) 49; and the AWD assembly 11 comprises a transfer case control unit (TCCU) 51. The ECU 47 controls operation of the internal combustion engine 21 and can increase or decrease the output torque (Nm) delivered to the transmission assembly 7 by the engine output shaft 25. A vehicle system control (VSC) module 52 within the ECU 47 controls the operation of the integrated electric traction motor 9 and arbitrates between electric traction motor torque delivery and engine torque delivery depending on vehicle system requirements and vehicle system conditions. The TCU 49 controls the operation of the first and second clutches 29, 31, and the automatic transmission 27. The TCU 49 is coupled to monitoring means for monitoring the transmission 27 and the second clutch 31. The monitoring means in the present embodiment is in the form of first and second temperature sensors 53, 55 disposed in the transmission casing to measure the respective temperatures of the second clutch 31 and the transmission bulk oil. The TCCU 51 monitors the status of the transfer case 39 and, in certain embodiments, could be configured to control the transfer case 39 automatically to select the high and low operating ranges.

The ECU 47, TCU 49, the TCCU 51, and the VSC 52 are connected to a message display centre 57, for example by an on-board communication bus, such as a CAN bus. In the present embodiment, the message display centre 57 comprises a display screen (not shown), such as a Liquid Crystal Display (LCD), for displaying status information and instructions to the user. The message display centre 57 is positioned in the instrument cluster in the present embodiment. In addition to, or instead of, providing a visual display of information, an audio output system could be implemented to provide an audio notification to the user.

As outlined above, the second clutch 31 is a launch control clutch and, in certain scenarios, can be subjected to high operating temperatures. In particular, scenarios combining a high engine speed (rpm) at low vehicle speed (kph) can result in high temperatures generated by friction between the clutch plates as they slip past each other. For example, in a hill-start scenario, the vehicle 1 can be held stationary by a braking force applied by the vehicle brake system (typically the park brake) and the second clutch 31 progressively engaged to deliver torque to replace the braking force. A further example is the scenario in which the vehicle 1 is towing a heavy load whilst travelling at a low speed (<15 kph), for example when travelling up a steep hill, and slip occurs across the second clutch 31. A still further example is the scenario in which the vehicle 1 is reversed up a kerb from a stationary position. These scenarios typically induce high levels of slip in the second clutch 31, resulting in high operating temperatures.

Over-heating can damage the second clutch 31, for example damage can occur if the clutch temperature exceeds 270°. Moreover, elevated temperatures within the automatic transmission 27 can cause degradation of the transmission bulk oil. The transmission bulk oils will typically degrade if the operating temperature exceeds 130° C. for an extended time period, or exceeds 180° C.-190° C. for a short time period.

Figure 2:
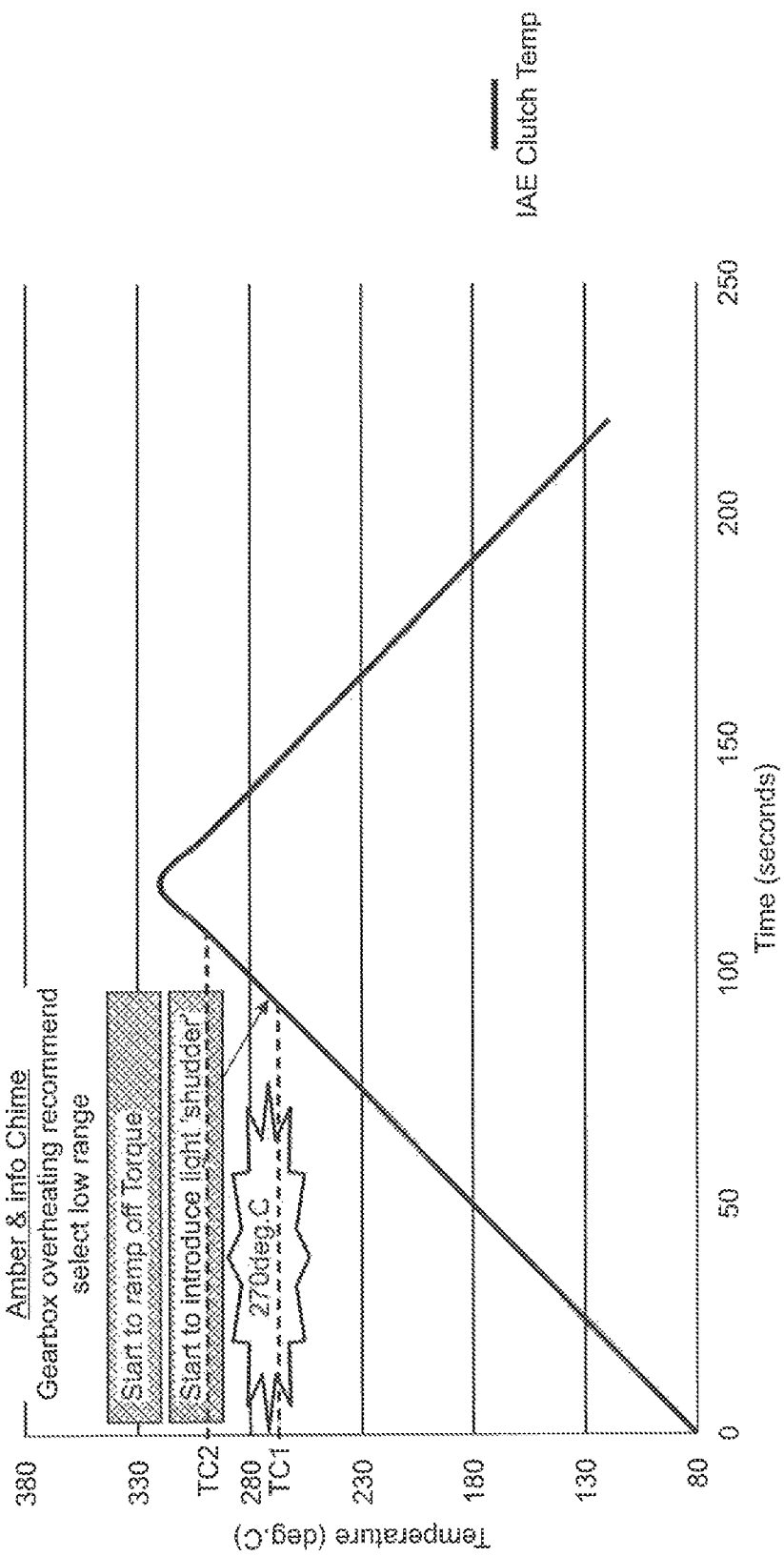
FIG. 2 shows a measured temperature of a launch control clutch and an associated strategy in accordance with an embodiment of the present invention.

The TCU 49 is configured to protect the second clutch 31 from damage. The first temperature sensor 53 monitors the temperature of the second clutch 31 to determine if it exceeds a first predefined clutch temperature threshold (TO which in the present embodiment is 270° C. As illustrated in FIG. 2, if the first temperature sensor 53 determines that the temperature of the second clutch 31 exceeds the first clutch temperature threshold ($T_{C1}$), the TCU 49 outputs a first notification signal to the message display centre 57 to display a first message: "Gearbox overheating. Recommend Low Range is selected." The first message can be accompanied with a first graphical warning sign, such as an exclamation mark inside a triangle displayed in amber. The message display centre 57 can optionally sound a chime to alert the user.

A second predefined clutch temperature threshold ($T_{C2}$), which is higher than the first predefined clutch temperature threshold ($T_{C1}$), can optionally also be defined. If the measured temperature of the second clutch 31 continues to increase and exceeds the second predefined clutch temperature threshold ($T_{C2}$), the TCU 49 outputs a second notification signal to the message display centre 57 to display a second message: "Gearbox overheating. Stop safely. Select Low Range." The second message can be accompanied with a second graphical warning sign, such as the same exclamation mark inside a triangle albeit displayed in red. Again, the message display centre 57 can optionally sound a chime to alert the user.

Figure 3:
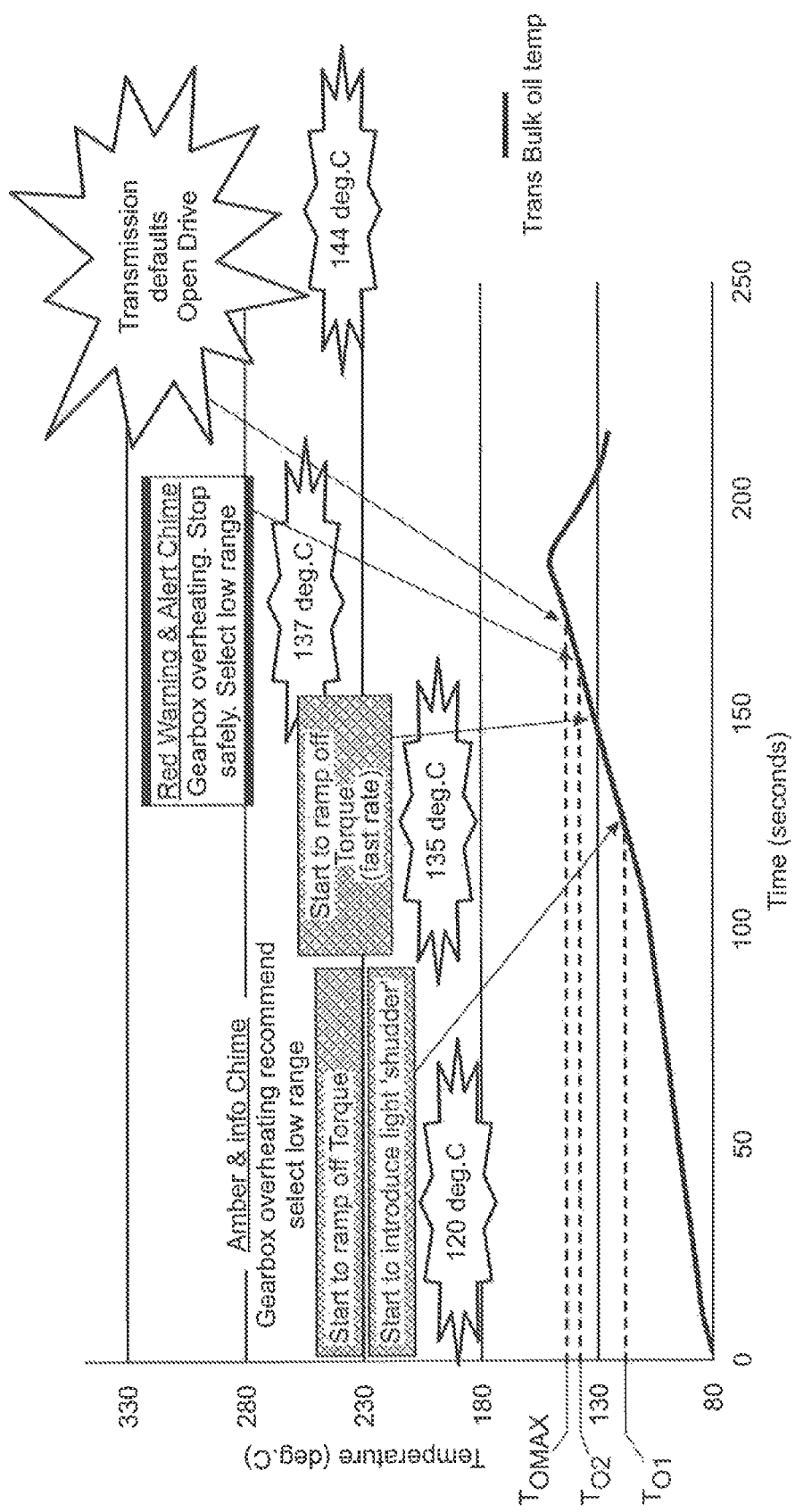
FIG. 3 shows a measured temperature of a transmission bulk oil and an associated strategy in accordance with an embodiment of the present invention.

The second temperature sensor 55 monitors the temperature of the transmission bulk oil to determine if it exceeds a first predefined oil temperature threshold ($T_{O1}$) which in the present embodiment is 120° C. As illustrated in FIG. 3, if the second temperature sensor 55 determines that the temperature of the transmission bulk oil exceeds the first oil temperature threshold ($T_{O1}$), the TCU 49 outputs said first notification signal to the message display centre 57 to display the first message along with the first graphical warning sign. If the measured temperature of the transmission bulk oil continues to increase and exceeds a second predefined oil temperature threshold ($T_{O2}$), which in the present embodiment is 137° C., the TCU 49 outputs the second notification signal to the message display centre 57 to display the second message along with the second graphical warning sign. The message display centre 57 can optionally sound a chime to alert the user when said first and second messages are displayed. The TCU 49 can also comprise a maximum oil temperature threshold ($T_{OMAX}$), which in the present embodiment is 144° C., above which the internal combustion engine 21 is disengaged, for example by disengaging the first and/or second clutches 29, 31. The vehicle could potentially roll back if the maximum oil temperature ($T_{OMAX}$) is reached. The TCU 49 can be configured to communicate with other vehicle systems, such as an anti-lock brake system (ABS) or the integrated electric traction motor 9, to prevent roll back of the vehicle.

The TCU 49 can be configured to provide additional control functions. For example, the TCU 49 can output said first notification signal and/or said second notification signal to the vehicle brake system. The vehicle brake system can be configured to initiate intermittent application of the vehicle brakes upon receipt of said notification signal(s). The vehicle brake system can thereby induce a 'shudder' sensation to alert the user that action is required. This haptic feedback technique is believed to be patentable independently.

Alternatively, or in addition, the TCU 49 can output said first notification signal and/or said second notification signal to the ECU 47. The ECU 47 can, for example, be configured to reduce the output torque delivered by the internal combustion engine 21 upon receipt of the notification signal(s). The ECU 47 could be configured to reduce the output torque to a predefined level, for example sufficient to hold the vehicle 1 in position even on a relatively steep gradient. In the present embodiment, the ECU 47 is configured to reduce the output torque to 300 Nm upon receipt of said first notification signal; and to inhibit torque delivery upon receipt of said second notification signal. The TCU 49 could also be configured to control the torque delivered by the integrated electric traction motor 9 in dependence on the temperature measurements from said first and second temperature sensors 53, 55. The vehicle brake system may be engaged automatically if the vehicle 1 is stationary or if it comes to rest.

The operation of the powertrain 3 will now be described with reference to FIGS. 1 to 3. In use, heat is generated due to friction between the clutch plates of the second clutch 31 as they slip in relation to each other. The changes in temperature of the second clutch 31 and the transmission bulk oil are measured by the first and second temperature sensors 53, 55 respectively, as illustrated in FIGS. 2 and 3. The TCU 49 outputs a first notification signal when the measured temperature of the second clutch 31 exceeds the first clutch temperature threshold ($T_{C1}$) of 270° C. (as shown in FIG. 2); or the measured temperature of the transmission bulk oil exceeds the first transmission bulk oil temperature threshold ($T_{O1}$) of 120° C.

The first notification signal is output to the message display centre 57 and the first message and the first graphical warning sign are displayed to prompt the user to select the Low Range in the transfer case 39. Upon receipt of the first notification signal, the ECU 47 can also reduce the output torque from the internal combustion engine 21. The rate at which the output torque is reduced can be varied in dependence on the measured transmission bulk oil temperature. A 'shudder' effect can optionally also be created by operating the vehicle brake system intermittently upon receipt of the first notification signal.

The TCU 49 continues to monitor the temperature of the second clutch 31 and the transmission bulk oil. If the temperature of the transmission bulk oil exceeds the second predefined oil temperature threshold ($T_{O2}$) of 137° C., the TCU 49 outputs a second notification signal to the message display centre 57. The message display centre 57 outputs the second message and the second graphical warning sign are displayed to prompt the user to stop the vehicle 3 and select the Low Range in the transfer case 39.

As illustrated in FIG. 3, if the temperature of the transmission bulk oil exceeds the maximum predefined oil temperature threshold ($T_{OMAX}$) of 144° C., the TCU 49 can operate the first clutch 29 and/or the second clutch 31 to disengage the internal combustion engine 21. The TCU 49 can also send a request to the vehicle brake system to apply the vehicle brakes to hold the vehicle stationary.

Although the embodiment herein has been described with reference to a hybrid vehicle 1, the invention is not limited to application in hybrid vehicles. Moreover, the invention can be implemented in vehicles in which the launch control clutch is not integrated into the transmission. For example, the launch control clutch can be disposed between the internal combustion engine and the transmission.

It will be appreciated that various changes and modifications can be made to the embodiment described herein without departing from the scope of the present invention. For example, rather than prompt the user to operate the transfer case 39 to select the Low Range, the TCU 49 could be configured automatically to select the Low Range.

Further aspects of the present invention are set out in the numbered paragraphs set out below.

1. A control system for a vehicle powertrain including a transmission, a launch control clutch, and a transfer case selectively operable in a high range and a low range; the control system comprising:
a monitor for monitoring one or more operating parameters of the launch control clutch and/or the transmission; and
a controller configured, in dependence on said monitor determining that said one or more operating parameters are above a predefined operating threshold or outside a predefined operating range, to output: (a) a notification to the user to select said low range; and/or (b) a transfer case control signal to the transfer case automatically to select said low range.

2. A control system as described in paragraph 1, wherein said one or more operating parameters comprise an operating temperature of the launch control clutch and/or the transmission.

3. A control system as described in paragraph 2, wherein said monitor is configured to determine when said operating temperature exceeds at least a first temperature threshold; and/or when said operating temperature exceeds at least a second temperature threshold over a defined time period.

4. A control system as described in paragraph 2, wherein the monitor comprises a first sensor for measuring the temperature of the launch control clutch; and/or a second sensor for measuring the temperature of the transmission lubricating fluid.

5. A control system as described in paragraph 2, wherein the monitor is configured to model the temperature of the launch control clutch and/or the transmission lubricating fluid.

6. A control system as described in paragraph 1, wherein the controller is configured to control the transmission automatically to select neutral; and/or to operate the launch control clutch to disengage the transmission.

7. A control system as described in paragraph 1, wherein the controller is configured to output a torque control signal to reduce or inhibit a torque delivered to the transmission.

8. A control system as described in paragraph 1, wherein the controller is configured to output a brake control signal to actuate a vehicle brake system to hold the vehicle stationary during selection of said low range.

9. A control system as described in paragraph 1, wherein the vehicle powertrain comprises an electric machine and an internal combustion engine, the launch control clutch being disposed between said electric machine and the internal combustion engine or between the electric machine and the transmission.

10. A vehicle comprising the control system as described in paragraph 1.

11. A method of operating a vehicle powertrain including a transmission, a launch control clutch, and a transfer case operable in a high range and a low range; the method comprising:
monitoring one or more operating parameters of the launch control clutch and/or the transmission; and
when said one or more operating parameters are above a predefined threshold or outside a predefined operating range, automatically selecting said low range and/or outputting a notification to the user to select said low range.

12. A method as described in paragraph 11, wherein the method comprises:
monitoring an operating temperature of the launch control clutch and/or the transmission;
determining when said operating temperature exceeds a first temperature threshold and/or a second temperature threshold over a defined time period.

13. A method as described in paragraph 11, wherein the method comprises operating the transmission automatically to select neutral before the transfer case controller selects said low range; and/or reducing an applied torque; and/or actuating a vehicle brake system to hold the vehicle stationary.

14. A control system for a vehicle powertrain including a transmission and a launch control clutch; the control system comprising:
means for monitoring one or more operating parameters of the launch control clutch and/or the transmission; and
a controller configured, in dependence on said monitoring means determining that said one or more operating parameters are above a predefined operating threshold or outside a predefined operating range, to output: (a) a notification to the user to operate the transmission to select a lower gear; and/or (b) a transmission control signal to the transmission automatically to select a lower gear.

15. A method of operating a vehicle powertrain including a transmission and a launch control clutch; the method comprising:
monitoring one or more operating parameters of the launch control clutch and/or the transmission; and
when said one or more operating parameters are above a predefined threshold or outside a predefined operating range, automatically selecting a lower gear in said transmission and/or outputting a notification to the user to select a lower gear in said transmission.

The invention claimed is:

1. A control system for a vehicle powertrain including a transmission, a launch control clutch, and a transfer case selectively operable in a high range and a low range; the control system comprising:
at least one receiver operable to receive signals indicative of an operating temperature of the launch control clutch and the transmission; and
a controller configured to output at least one of:
(a) a notification to a user to select said low range; and
(b) a transfer case control signal to the transfer case to automatically select said low range,
based upon one of the operating temperatures being above a predefined operating threshold.

2. The control system as claimed in claim 1, wherein said predefined operating threshold comprises a first temperature threshold, and wherein said controller is configured to detect when said operating temperature exceeds at least the first temperature threshold over a defined time period.

3. The control system as claimed in claim 2, wherein said predefined operating threshold comprises a second temperature threshold, and wherein said controller is configured to detect when said operating temperature exceeds at least the second temperature threshold over a defined time period.

4. The control system as claimed in claim 1, wherein the received signals comprise signals from a first sensor for measuring the operating temperature of the launch control clutch and from a second sensor for measuring the operating temperature of the lubricating fluid of the transmission.

5. The control system as claimed in claim 1, wherein at least one of the received signals comprises a modelled operating temperature of at least one of the launch control clutch and the lubricating fluid of the transmission.

6. The control system as claimed in claim 1, wherein the controller is configured to control the transmission automatically to select neutral.

7. The control system as claimed in claim 1, wherein the controller is configured to operate the launch control clutch to disengage the transmission.

8. The control system as claimed in claim 1, wherein the controller is configured to output a torque control signal to reduce or inhibit a torque delivered to the transmission.

9. The control system as claimed in claim 1, wherein the controller is configured to output a brake control signal to actuate a vehicle brake system to hold the vehicle stationary during selection of said low range.

10. The control system as claimed in claim 1, wherein the vehicle powertrain comprises an electric machine and an internal combustion engine, the launch control clutch being disposed between said electric machine and the internal combustion engine or between the electric machine and the transmission.

11. The control system as claimed in claim 1, wherein, in dependence on said controller determining that said one or more operating temperatures are above the predefined operating threshold, the controller is configured to output one or more of the following notifications to the user: a message to slow the vehicle; a message to bring the vehicle to rest; and a message to reduce the requested torque.

12. The control system as claimed in claim 1, wherein the controller is configured to control operation of a second clutch for dissipating heat in dependence on said controller determining that said operating temperatures are above the predefined operating threshold.

13. The control system as claimed in claim 1, wherein a coolant system is provided for dissipating heat from the launch control clutch, the controller being configured to control operation of the coolant system in dependence on said controller detecting that said one or more operating temperatures are above the predefined operating threshold.

14. The control system as claimed in claim 1, wherein the control system is configured to control operation of at least one of an external fan and a coolant pump for dissipating heat from the launch control clutch, the controller being configured to control operation of the external fan and the coolant pump in dependence on said controller determining that said one or more operating parameters are above the predefined operating threshold or outside the predefined operating range.

15. A vehicle comprising the control system claimed in claim 1.

16. A method of operating a vehicle powertrain including a transmission, a launch control clutch, and a transfer case operable in a high range and a low range; the method comprising:

monitoring an operating temperature of the launch control clutch and an operating temperature of the transmission; and when one of said operating temperatures is above a predefined threshold, outputting at least one of: (a) a notification to a user to select said low range, and (b) a transfer case control signal to the transfer case to automatically select said low range.

17. The method as claimed in claim 16, wherein the predefined threshold comprises a first temperature threshold and a second temperature threshold, and wherein the method comprises:

determining when said operating temperature exceeds at least one of the first temperature threshold and the second temperature threshold over a defined time period.

18. The method as claimed in claim 16, wherein the method comprises one or more of the following: operating the transmission automatically to select neutral before the transfer case controller selects said low range; reducing an applied torque; and actuating a vehicle brake system to hold the vehicle stationary.

19. A controller for a vehicle powertrain, wherein the controller is operable to receive a signal indicative of an operating temperature of a launch control clutch and a signal indicative of an operating temperature of a transmission, wherein the controller, in dependence on one of said operating temperatures being above a predefined operating threshold, is configured to output at least one of: (a) a notification to the user to select said low range; and (b) a transfer case control signal to the transfer case to automatically select said low range.

20. The controller as claimed in claim 19, wherein the controller is configured to control the transmission to automatically select neutral.

* * * * *